US010703498B2

(12) United States Patent
Hodges et al.

(10) Patent No.: US 10,703,498 B2
(45) Date of Patent: Jul. 7, 2020

(54) METHODS AND AIRCRAFT FOR OPTIMIZED REVERSE THRUST OPERATION DURING LANDING

(71) Applicant: The Boeing Company, Chicago, IL (US)

(72) Inventors: Christopher M. Hodges, Chicago, IL (US); Melissa L. Gates, Chicago, IL (US)

(73) Assignee: The Boeing Company, Chicago, IL (US)

(*) Notice: Subject to any disclaimer, the term of this patent is extended or adjusted under 35 U.S.C. 154(b) by 434 days.

(21) Appl. No.: 15/801,486

(22) Filed: Nov. 2, 2017

(65) Prior Publication Data

US 2019/0127076 A1    May 2, 2019

(51) Int. Cl.
*B64D 31/10* (2006.01)
*B64D 45/00* (2006.01)
*B64D 27/18* (2006.01)

(52) U.S. Cl.
CPC ......... *B64D 31/10* (2013.01); *B64D 45/0005* (2013.01); *B64D 27/18* (2013.01); *B64D 2045/0085* (2013.01)

(58) Field of Classification Search
CPC .... B64D 31/10; B64D 31/12; B64D 45/0005; B64D 2045/001
See application file for complete search history.

(56) References Cited

U.S. PATENT DOCUMENTS

| 4,040,581 A * | 8/1977 | Schlanert ............... B64C 13/30 244/233 |
| 2004/0139727 A1* | 7/2004 | Horswill .................. F02C 9/28 60/233 |
| 2005/0116096 A1* | 6/2005 | Andre .................... B64D 27/18 244/75.1 |
| 2009/0320445 A1* | 12/2009 | Dupre .................... B64D 31/10 60/228 |
| 2010/0302074 A1* | 12/2010 | Campagne ............. B64D 31/04 340/971 |
| 2011/0108665 A1* | 5/2011 | Abrial ...................... F02C 9/00 244/110 B |

(Continued)

FOREIGN PATENT DOCUMENTS

| GB | 1246616 A * | 9/1971 | ............... F02K 1/76 |
| WO | WO-2012148398 A1 * | 11/2012 | ............. B64D 31/10 |

*Primary Examiner* — Donald J Wallace
(74) *Attorney, Agent, or Firm* — McDonnell Boehnen Hulbert & Berghoff LLP

(57) ABSTRACT

An example method of optimizing reverse thrust operation on an aircraft having two or more engines while landing the aircraft is described. The method includes operating the two or more engines on the aircraft in a reverse idle during a landing rollout of the aircraft, responsively causing deployment of a thrust reverser on each of the engines causing a first reverse idle thrust for slowing the aircraft, monitoring each of the engines for failure of deployment of the thrust reverser, and based on detection of a failure of deployment of a respective thrust reverser on one of the engines, operating the one of the engines on the aircraft at a second reverse idle thrust optimized for a direction of an applied thrust of the one of the engines. The second reverse idle thrust is lower than the first reverse idle thrust.

20 Claims, 8 Drawing Sheets

(56) References Cited

U.S. PATENT DOCUMENTS

| | | | |
|---|---|---|---|
| 2014/0229122 A1* | 8/2014 | Horabin | F02K 1/763 702/35 |
| 2015/0090810 A1* | 4/2015 | Lallement | F02K 1/763 239/265.19 |
| 2015/0142220 A1* | 5/2015 | Scacchi | G05D 1/0083 701/3 |
| 2016/0121998 A1* | 5/2016 | Martin Moreno | B64C 11/46 701/3 |
| 2017/0113809 A1 | 4/2017 | Hodges et al. | |

* cited by examiner

METHODS AND AIRCRAFT FOR OPTIMIZED REVERSE THRUST OPERATION DURING LANDING

FIELD

The present disclosure relates generally to operation of an aircraft, and more particularly, to methods for operation of an aircraft during landing using optimized reverse thrust techniques.

BACKGROUND

An aircraft, landing includes a touchdown, bringing the aircraft to taxi speed, and eventually bringing the aircraft to a complete stop. During a landing, commercial jet engines can continue to produce thrust causing the aircraft to move in a forward direction, even when idle, acting against deceleration of the aircraft. Brakes of landing gear of aircraft can be sufficient in normal circumstances to stop the aircraft, by themselves, but for safety purposes, and to reduce stress on the brakes, another deceleration method is often used. In scenarios involving bad weather, where factors like snow or rain on runways reduce effectiveness of brakes, and in emergencies like rejected takeoffs, the need for a secondary deceleration method is more pronounced.

An example secondary deceleration method is to reverse a direction of the exhaust stream of the jet engine and use the power of the engine itself to decelerate. Reverse thrust, also called thrust reversal, is a temporary diversion of an aircraft engine's thrust so that it is directed against a forward travel of the aircraft to provide deceleration. Thrust reverser systems are included on many aircraft to help slow down the aircraft after touch-down, which reduces wear on brakes and enables shorter landing distances.

Existing reverser systems typically enable a pilot to command reverse thrust, if needed, but do not optimize the level of reverse thrust provided. Thus, improvements are needed to optimize airplane landing efficiencies.

SUMMARY

In an example, a method of optimizing reverse thrust operation on an aircraft having two or more engines while landing the aircraft is described. The method comprises operating the two or more engines on the aircraft in a reverse idle during a landing rollout of the aircraft, responsively causing deployment of a thrust reverser on each of the two or more engines causing a first reverse idle thrust for slowing the aircraft, monitoring each of the two or more engines for failure of deployment of the thrust reverser, and based on detection of a failure of deployment of a respective thrust reverser on one of the two or more engines, operating the one of the two or more engines on the aircraft at a second reverse idle thrust optimized for a direction of an applied thrust of the one of the two or more engines. The second reverse idle thrust is lower than the first reverse idle thrust.

In another example, a non-transitory computer readable storage medium is described having stored therein instructions, that when executed by a computing device having one or more processors, causes the computing device to perform functions. The functions comprise operating two or more engines on an aircraft in a reverse idle during a landing rollout of the aircraft, responsively causing deployment of a thrust reverser on each of the two or more engines causing a first reverse idle thrust for slowing the aircraft, monitoring each of the two or more engines for failure of deployment of the thrust reverser, and based on detection of a failure of deployment of a respective thrust reverser on one of the two or more engines, operating the one of the two or more engines on the aircraft at a second reverse idle thrust optimized for a direction of an applied thrust of the one of the two or more engines. The second reverse idle thrust is lower than the first reverse idle thrust.

In another example, an aircraft is described. The aircraft comprises two or more engines each having a thrust reverser for causing a first reverse idle thrust for slowing the aircraft and a second reverse idle thrust for minimizing thrust in a failure case. The second reverse idle thrust is lower than the first reverse idle thrust such that a magnitude of thrust is reduced in the failure case. The aircraft also comprises sensors for each of the thrust reverser on each of the two or more engines, and a respective sensor is positioned proximal to the thrust reverser of a respective engine and the respective sensor provides outputs indicative of a position of the thrust reverser for the respective engine. The aircraft also comprises a controller for each of the two or more engines, having one or more processors for receiving the outputs of the respective sensor and determining based on the position of the thrust reverser for the respective engine whether a threshold amount of the thrust reverser has been deployed to cause the first reverse idle thrust during a landing rollout of the aircraft. The controller further, based on detection of a failure of deployment of a respective thrust reverser on one of the two or more engines at least the threshold amount, operating the one of the two or more engines at a second reverse idle thrust optimized for a direction of an applied thrust of the one of the two or more engines.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
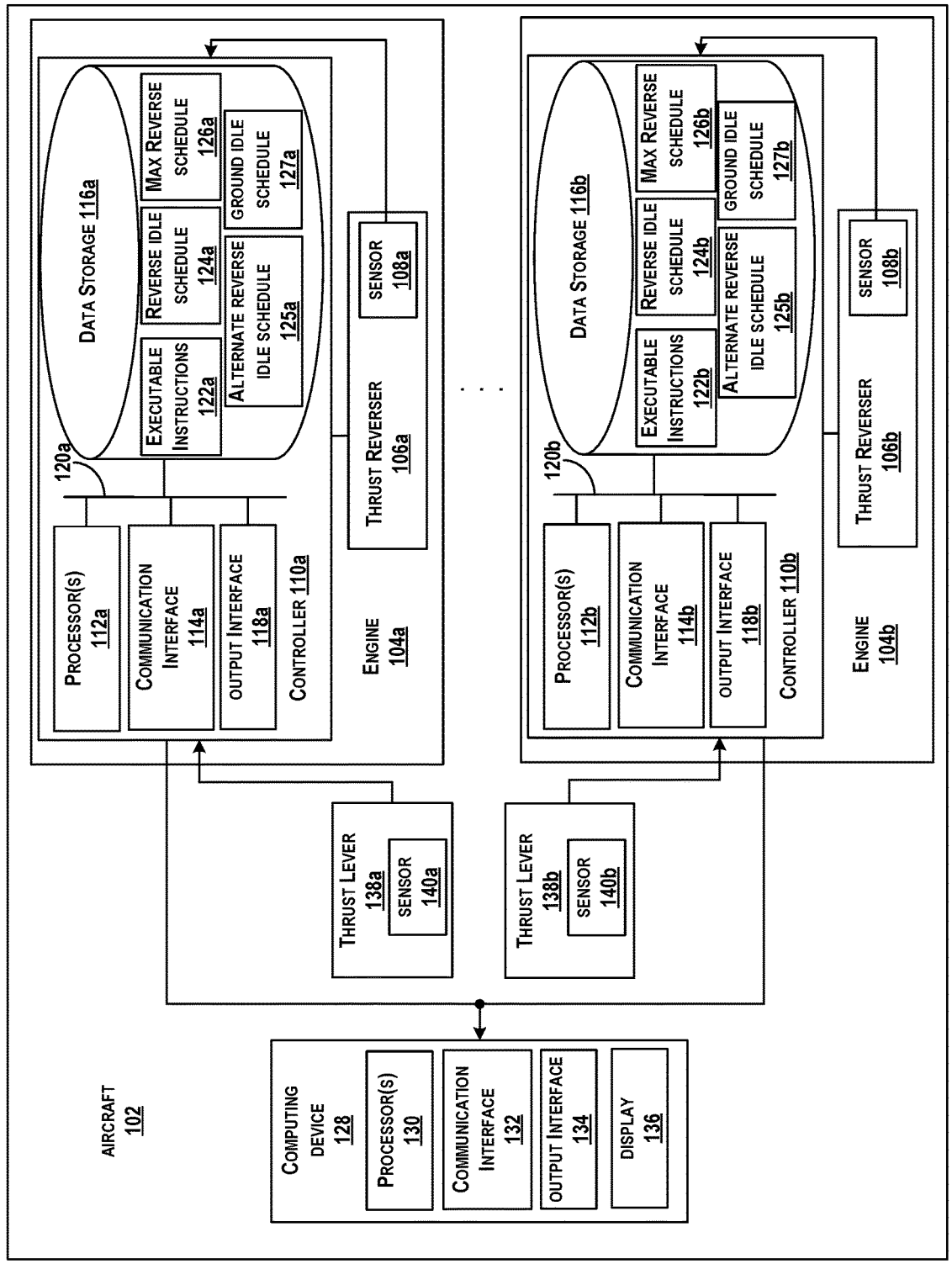
FIG. 1 is an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Reverse thrust control of engines is used by many commercial aircraft to augment traditional wheel brakes for landing performance. Some reverse thrust techniques operate engines at a reverse idle level initially at touchdown of the airplane to assist in quick acceleration to maximum reverse thrust if commanded by the pilot. For example, reverse idle of an engine aids in operation of the engine to spin-up to a maximum reverse thrust upon landing touchdown if commanded by the pilot. Engine manufacturers are required to provide a specific response to maximum reverse thrust command upon landing (e.g., time to achieve maximum reverse), and so the reverse idle thrust level enables such performance. This reverse idle is only allowed to operate for a short period of time to support maximum reverse spin-up at touchdown, at which point, lower ground idle is selected. In any event, the reverse idle is not used in existing systems to provide reverse thrust at levels under the maximum reverse thrust.

Within examples herein, methods and systems are described to optimize use of reverse thrust capabilities for stopping performance by using elevated reverse idle scheduling without maximum reverse thrust use (although maximum reverse thrust may be available at any time on the ground via command by the pilot). For example, reverse idle can be scheduled to persist in a steady-state manner for a length of a landing rollout of the aircraft in an increased magnitude to provide improved reverse idle thrust-only landing performance. This removes a specified persistence time for reverse idle as seen in existing systems. Landing performance of an aircraft will benefit from a higher reverse idle thrust (steady-state), regardless of maximum reverse thrust use, and such reverse idle scheduling can enable use of reverse idle only landings (no braking), resulting in lower engine operating costs due to maintenance and lower noise profile in landing as compared to maximum reverse thrust use. This improved reverse idle stopping performance can also be utilized for airplane stopping performance guarantees, such as reverse idle thrust only stopping.

In some instances, use of reverse idle thrust can lead to thrust asymmetry effecting aircraft controllability or leading to sizing of airplane systems/functions in order to maintain aircraft controllability (larger rudder, nose gear design, etc.). For example, if the reverse thrust from the aircraft is not symmetrical, e.g., due to an engine failure, etc., control and stability issues can arise. Additionally, several components (e.g. nose steering controls, rudder, etc.) are designed to maintain control of the aircraft, on their own, in an event of an engine failure. Within examples described herein, failures of a thrust reverser during the reverse idle scheduling can be accommodated minimizing a risk of high asymmetric thrust. Alternate reverse idle scheduling can be implemented as a function of thrust reverser failure detection so as to revert to a lower idle thrust in a thrust reverser failure to deploy scenario.

As a result, aircraft control can be maintained in failure conditions without requiring existing systems on the airplane (e.g., nose steering, nose landing gear, vertical tail/rudder, etc.) to be large enough to maintain control on their own. Using the example reverse idle scheduling, existing systems may be sized based on other considerations, and possibly smaller than would otherwise be necessitated by any failure condition so as to achieve an overall airplane benefit (e.g., reduced complexity, reduced size, reduced weight, reduced drag, reduced cost, etc.).

Referring now to the figures, FIG. 1 is an aircraft 102, according to an example implementation. The aircraft 102 includes two or more engines 104a-b, each having a thrust reverser 106a-b for causing a first reverse idle thrust for slowing the aircraft 102 and a second reverse idle thrust for minimizing thrust in a failure case. The second reverse idle thrust is lower than the first reverse idle thrust such that a magnitude of thrust is reduced in the failure case.

While the aircraft 102 is illustrated with two engines 104a-b, more than two engines may be included, and each engine includes substantially the same components, for example. In some examples, the aircraft 102 may be considered to include a plurality of engines.

The engine 104a-b may be capable of producing thrust in a forward direction at various levels of thrust, and the thrust reverser 106a-b is a component of the engine 104a-b and redirects flow to reverse a thrust direction of the engine 104a-b to be opposite a direction of travel of the aircraft 102. The engine 104a-b may be operated at an idle speed or at idle upon touchdown of the aircraft 102 until reverse thrust is commanded by the pilot, at which time forward thrust scheduling is discontinued, to enable use of a reverse idle thrust schedule. In one example, idle speed or operating at idle indicates the engine is operating at a minimum schedule required to provide pneumatic bleed air necessary for airplane system functions or to meet minimum stability and operability requirements of the engine.

The aircraft 102 also includes sensors 108a-b for each of the thrust reverser 106a-b on each of the engines 104a-b. The sensors 108a-b are positioned proximal to the thrust reverser 106a-b of a respective engine 104a-b, and the sensors 108a-b provide outputs indicative of a position of the thrust reverser 106a-b for the respective engine 104a-b. For example, the sensors 108a-b may be positioned adjacent or coupled to the thrust reverser 106a-b to determine a position of the thrust reverser 106a-b. The sensors 108a-b may be positioned on a moving component of the thrust reverser 106a-b, and can output information indicative of movement of the component, as well as a percent of deployment of the thrust reverser 106a-b based on movement of the thrust reverser 106a-b. In one example, the sensors 108a-b include a Linear Variable Differential Transducer (LVDT) to measure position of cowl mounted thrust reversers (e.g., modern wing mounted engines).

The aircraft 102 also includes a controller 110a-b for each of the two or more engines 104a-b. Each controller 110a-b may be a computing device and has one or more processors 112a-b for receiving outputs of the sensors 108a-b, and also a communication interface 114a-b, data storage 116a-b, and an output interface 118a-b each connected to a communication bus 120a-b. The controller 110a-b may also include hardware to enable communication within the controller 110a-b and between the controller 110a-b and other devices (not shown). The hardware may include transmitters, receivers, and antennas, for example.

The communication interface 114a-b may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 114a-b may be configured to receive input data from one or more devices, and may also be configured to send output data to other devices.

The data storage 116a-b may include or take the form of one or more computer-readable storage media that can be read or accessed by the processor(s) 112a-b. The computer-readable storage media can include volatile and/or non-volatile storage components, such as optical, magnetic, organic or other memory or disc storage, which can be integrated in whole or in part with the processor(s) 112a-b. The data storage 116a-b is considered non-transitory computer readable media. In some examples, the data storage 116a-b can be implemented using a single physical device (e.g., one optical, magnetic, organic or other memory or disc storage unit), while in other examples, the data storage 116a-b can be implemented using two or more physical devices.

The data storage 116a-b thus is a non-transitory computer readable storage medium, and executable instructions 122a-b are stored thereon. The instructions 122a-b include computer executable code. The data storage 116a-b also stores a reverse idle schedule 124a-b (i.e. "first reverse idle thrust"), an alternate reverse idle schedule 125a-b (i.e. "second reverse idle thrust"), a maximum reverse schedule 126a-b, and a ground idle schedule 127a-b that each include a data schedule for operating the engine 104a-b upon touchdown (described more fully below).

The processor(s) 112a-b may be a general-purpose processor or a special purpose processor (e.g., digital signal processors, application specific integrated circuits, etc.). The processor(s) 112a-b may receive inputs from the communication interface 114a-b as well as from the sensors 108a-b, and process the inputs to generate outputs that are stored in the data storage 116a-b and used to control the thrust reverser 106a-b. The processor(s) 112a-b can be configured to execute the executable instructions 122a-b (e.g., computer-readable program instructions) that are stored in the data storage 116a-b and are executable to provide the functionality of the controller 110a-b described herein.

The output interface 118a-b outputs information to an aircraft computing device 128, which itself includes a processor 130, a communication interface 132, an output interface 134, and a display 136. Thus, the output interface 118a-b may be similar to the communication interface 114a-b and can be a wireless interface (e.g., transmitter) or a wired interface as well.

The aircraft 102 also includes a thrust lever 138a-b for each engine 104a-b that is coupled to the controller 110a-b of each engine 104a-b. The thrust lever 138a-b may be in a cockpit of the aircraft 102, and a pilot uses the thrust lever 138a-b to command forward or reverse thrust. Thus, a pilot uses the thrust lever 138a-b to command deployment of the thrust reverser 106a-b on each of the engines 104a-b. Thus, the thrust lever 138a-b is a pilot interface for control of the thrust reverser 106a-b.

Each thrust lever 138a-b has an associated sensor 140a-b to detect a position of the thrust lever 138a-b, for example, and to output information of the position of the thrust lever 138a-b to the controller 110a-b. The controller 110a-b uses the output information of the position of the thrust lever 138a-b to control deployment of the thrust reverser 106a-b (direction of thrust vector) and the overall thrust of the engine (magnitude of thrust). In one example, the sensors 140a-b may include rotary variable differential transducers (RVDTs).

Figure 2:
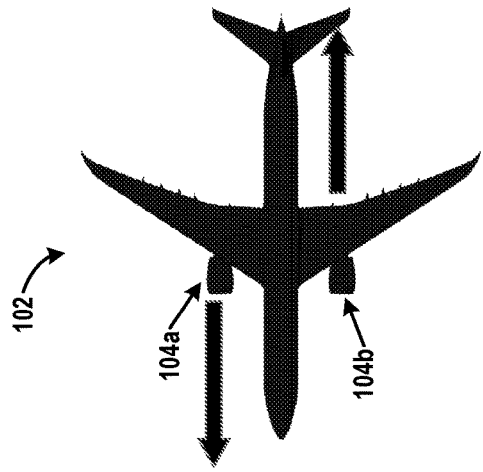
FIG. 2 illustrates example thrust vectors for each of the engines in a scenario where the engines are operating at forward idle thrust, according to an example implementation.

Within examples, the controller 110a-b optimizes reverse thrust control of the aircraft 102 by using reverse idle to assist in slowing the aircraft 102. Upon touchdown for landing the engines 104a-b are operating at forward idle thrust. FIG. 2 illustrates example thrust vectors for each of the engines 104a-b in a scenario where the engines 104a-b are operating at forward idle thrust, according to an example implementation. As shown, the arrows represent the thrust vectors and a length of the arrows represents a relative magnitude of the thrust. Thus, upon touchdown, each engine 104a-b will be operating at a minimal forward thrust causing the aircraft 102 to move forward.

Figure 3:
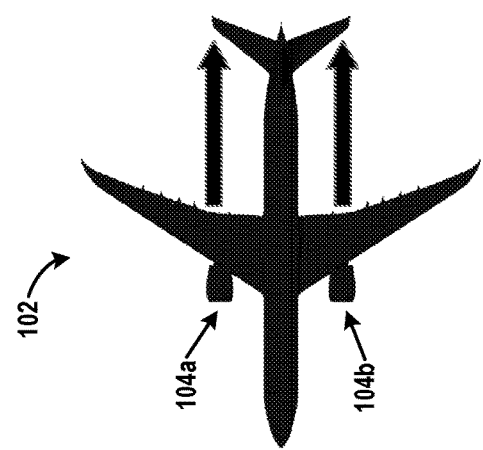
FIG. 3 illustrates example thrust vectors for each of the engines in a scenario where the engines are operating at reverse idle thrust, according to an example implementation.

The pilot can then move the thrust lever 138a-b to a reverse idle position to initiate a thrust reverse command. FIG. 3 illustrates example thrust vectors for each of the engines 104*a-b* in a scenario where the engines 104*a-b* are operating at reverse idle thrust, according to an example implementation. In FIG. 3, the arrows are in a reverse direction from that shown in FIG. 2 to illustrate the reverse thrust being applied. Thus, reverse thrust (lower than a maximum reverse thrust level) can be selected to be applied immediately after touchdown to improve deceleration early in the landing rollout when residual aerodynamic lift and high speed can limit effectiveness of brakes located on the landing gear, for example.

In existing system, reverse idle is initiated on the engines 104*a-b* to allow spin-up time to max reverse if commanded by the pilot upon touchdown. The reverse idle level times out with an arbitrary/fixed time after landing, and if the pilot waits too long to command max reverse, the engine 104*a-b* no longer is required to respond immediately for max reverse thrust. The reverse idle is generally set to time-out at about three seconds after which the reverse idle decreases to a lower idle level referred to as ground idle. This is generally to preclude airplane controllability issues if the thrust reverser 106*a-b* fails to deploy.

Within examples herein, the reverse idle does not time-out, and a higher reverse idle steady state is used to further benefit stopping performance of the aircraft 102 for the duration of the landing rollout. As a result, the aircraft 102 may have improved stopping performance without any pilot input for higher reverse thrust.

Figure 4:
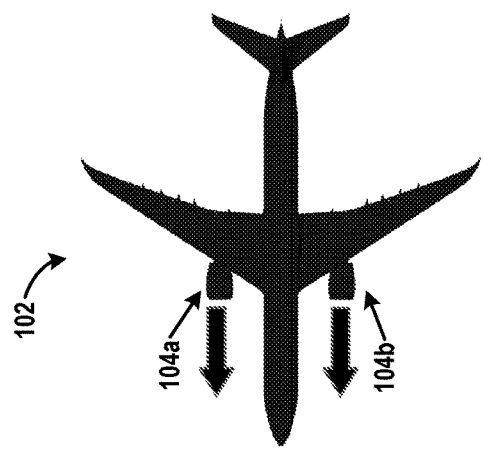
FIG. 4 illustrates example thrust vectors for each of the engines in a scenario where the engines are operating at reverse idle thrust, however due to a thrust reverser failure, the right engine thrust acts in the forward direction, according to an example implementation.

With a higher reverse idle steady state, however, asymmetric operation of the engines 104*a-b* can cause aircraft controllability issues. FIG. 4 illustrates example thrust vectors for each of the engines 104*a-b* in a scenario where the engines 104*a-b* are operating at an asymmetric operation due to a thrust reverser failure, according to an example implementation. As shown, in FIG. 4, the thrust reverser 106*a* on the right engine 104*a* failed to operate, and thus, the right engine 104*a* still provides forward thrust while the left engine 104*b* provides reverse thrust. Further, as shown, the thrust level has been increased (by reference to the increased arrow length) in an effort to slow down the aircraft 102, and thus, the failure of one engine is magnified. Thus, additional failure detection mechanisms are employed via outputs of the sensors 108*a-b* to detect whether the thrust reverser 106*a-b* is operating as desired.

Within one example, in operation, when the instructions 122*a-b* are executed by the processor(s) 112*a-b* of each controller, the processor(s) 112*a-b* are caused to perform functions including receiving the outputs of the respective sensor 108*a-b* and determining based on the position of the thrust reverser 106*a-b* for the respective engine 104*a-b* (as indicated by the outputs of the sensor 108*a-b*) whether a threshold amount of the thrust reverser 106*a-b* has been deployed to cause the first reverse idle thrust during a landing rollout of the aircraft 102. The controller 110*a-b* further determines if there is a failure of deployment of a respective thrust reverser 106*a-b* on one of the two or more engines 104*a-b* at least the threshold amount, and if so, operates the one of the two or more engines 104*a-b* at a second reverse idle thrust optimized for a direction of an applied thrust of the one of the two or more engines 104*a-b*.

Figure 5:
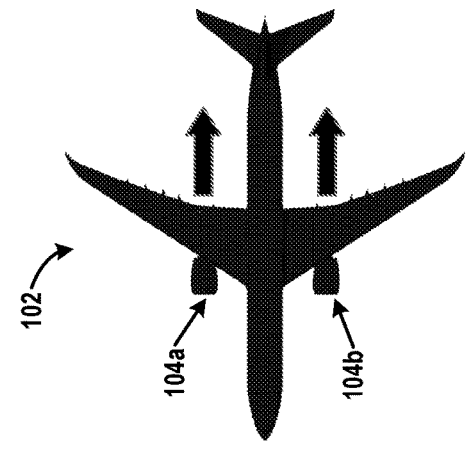
FIG. 5 illustrates example thrust vectors for each of the engines in a scenario where the right engine is operated at the second reverse idle thrust, according to an example implementation.

FIG. 5 illustrates example thrust vectors for each of the engines 104*a-b* in a scenario where the failed right engine 104*a* is operated at the second reverse idle thrust, according to an example implementation. Thus, since the thrust reverser 106*a* failed to reverse the thrust direction of the right engine 104*a*, the alternate reverse idle schedule lowers the thrust level on the right engine 104*a* to minimize issues of asymmetric operation and extending stopping distance.

Figure 6:
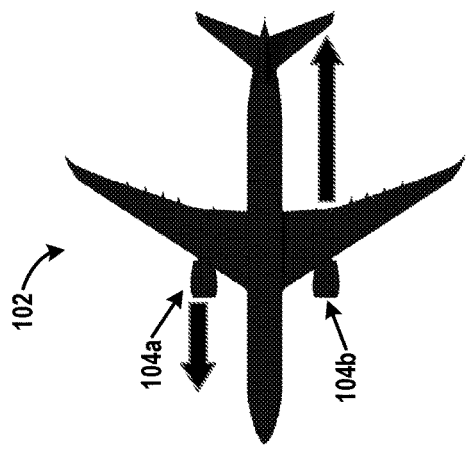
FIG. 6 illustrates example thrust vectors for each of the engines in a scenario where the reverse thrust is decreased on the engines, according to an example implementation.

FIG. 6 illustrates example thrust vectors for each of the engines 104*a-b* in a scenario where the reverse thrust is decreased on the engines 104*a-b*, according to an example implementation. For example, once a speed of the aircraft 102 has slowed, reverse thrust is decreased to prevent reversed airflow from throwing debris in front of the engine where it can be ingested, causing foreign object damage, and as shown in FIG. 6, the reverse thrust level is decreased and a length of the arrows represents the decreases in the reverse thrust levels.

Figure 7:
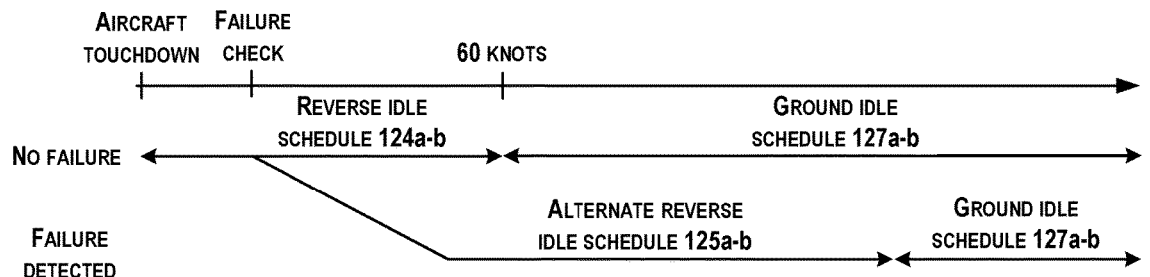
FIG. 7 is an example time line illustrating a landing rollout of the aircraft and application of an optimized reverse idle schedule, according to an example implementation.

FIG. 7 is an example time line illustrating a landing rollout of the aircraft and application of an optimized reverse idle schedule 124*a-b*, according to an example implementation. In FIG. 7, upon touchdown of the aircraft 102, reverse idle is commanded by the pilot via the thrust lever 138*a-b*, and the sensor 140*a-b* sends the command signal to the controller 110*a-b*. The controller 110*a-b* then causes the thrust reverser 106*a-b* to move and redirect thrust appropriately. A thrust level of the reverse idle may be the same as or higher than a typical reverse idle, and may be set to optimize failure-free airplane stopping performance while accounting for noise abatement and engine maintenance cost reduction, as depicted in FIG. 3. An example optimization may include a higher thrust be supplied at the expense of additional maintenance to the engines.

At any time following initiating of the reverse idle thrust, the pilot may select use of the maximum reverse schedule 126*a-b*, if needed.

Once aircraft touchdown occurs, the pilot commands reverse idle 124*a-b* via the thrust lever 138*a-b*, and the sensor 140*a-b* sends the signal to the controller 110*a-b*, and the controller 110*a-b* begins to deploy the thrust reverser 106*a-b* to begin slowing the aircraft 102 using reverse idle thrust.

Within examples herein, use of the higher level reverse idle schedule 124*a-b* for stopping the aircraft 102 or use of the maximum reverse schedule 126*a-b* during landing requires monitoring engine operation to ensure aircraft controllability. For example, thrust vectors on wing mounted engines contribute to lateral stability of the aircraft 102, and if a failure occurs on one engine or a failure to deploy a thrust reverser to a threshold amount occurs, then asymmetric thrust vectors will be present on the aircraft 102 that need to be overcome by other aircraft systems to maintain aircraft controllability (e.g., nose wheel steering and rudder will be required to be used for controllability), as depicted in FIG. 4.

As a result, failure logic detection is used to monitor a length of time that the reverse idle thrust has been engaged and an amount of deployment of the thrust reverser 106*a-b* (percent of deployment). If no failure is detected by the controller 110*a-b*, the reverse idle schedule 124*a-b* continues. If no failure is detected, the ground idle schedule 127*a-b* is then activated once the aircraft has slowed down to predetermined speed. For example, once a speed of the aircraft 102 has slowed, reverse thrust is reduced to prevent reversed airflow from throwing debris in front of the engine where it can be ingested, causing foreign object damage, as depicted in FIG. 6 (no failures, and when aircraft slows down enough, length of arrows from 17 changes to 20). If circumstances require it, reverse thrust can be used all the way to a complete stop, or even to provide thrust to push the aircraft backward, though aircraft tugs or tow bars may be more commonly used for that purpose, for example.

Thus, the reverse idle schedule 124*a-b* can be implemented until a speed of the aircraft 102 slows to below a threshold, at which time the controller 110*a-b* operates the engines 104*a-b* at the ground idle schedule 127*a-b*. The controller 110*a-b* may operate the engine 104*a-b* at the reverse idle schedule 124*a-b* for an unlimited duration of use until a speed reaches a low threshold. In examples of an aircraft landing at an airport with a long runway, utilizing the reverse idle schedule 124*a-b* for reverse thrust can minimize any need for brake use to slow or stop the aircraft 102.

The controller 110*a-b* may operate the engine 104*a-b* using the reverse idle schedule 124*a-b* for approximately 0-3 seconds upon touchdown of the aircraft 102 and reverse idle command by the pilot, after which time the controller 110*a-b* checks outputs of the sensors 108*a-b* to determine if a failure has occurred. If a failure is detected by the controller 110*a-b*, an alternate reverse idle schedule 125*a-b* is activated, as depicted in FIG. 5. For example, the alternate reverse idle schedule 125*a-b* is optimized to use a lowest possible idle. The alternate reverse idle schedule 125*a-b* can implement operating at a second reverse idle thrust optimized for a direction of an applied thrust of the failed engine, and the second reverse idle thrust is lower than a reverse idle thrust of the original reverse idle schedule 124*a-b*.

A failure may occur if the thrust reverser 106*a-b* fails to redirect airflow in a direction of travel of the aircraft 102. The sensors 108*a-b* (e.g., position sensors to detect position of the thrust reverser 106*a-b*) are used to determine a position of the thrust reverser 106*a-b*, and thus, a direction of thrust of the engine 104*a-b*.

Within one example, upon detection of a failure of deployment of any of the thrust reversers 106*a-b* to a desired amount (e.g., 60% deployment or more), the controller 110*a-b* of the failed engine operates the engine 104*a-b* to a second reverse idle thrust schedule (alternate reverse idle schedule 125*a-b*) for that engine only, as depicted in FIG. 5. This minimizes any effect of the failure of the thrust reverser 106*a-b* on the failed engine from contributing to aircraft 102 controllability.

As a result, a new way of using reverse idle thrust for improved stopping performance of the aircraft 102 is provided that lowers usage of brakes to reduce maintenance needed on the aircraft 102. The new usage of the reverse idle thrust are possible due to including failure detection that enable corrective actions to take place upon detection of failure of reverse thrust by any of the engines.

Figure 8:
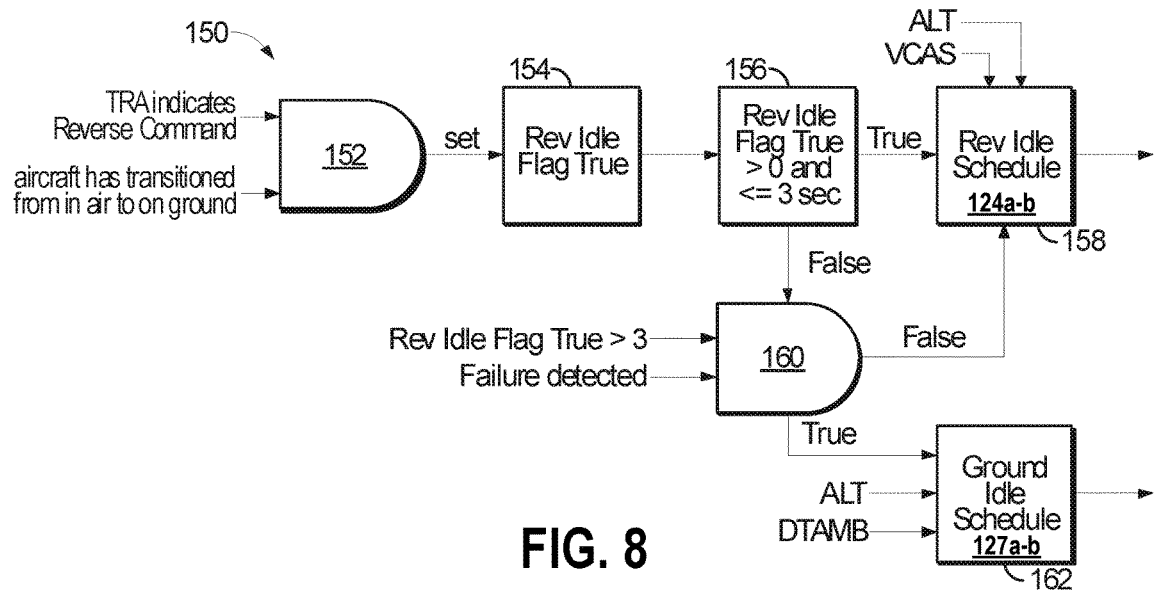
FIG. 8 is an example flow diagram for initiating an optimized reverse idle schedule, according to an example implementation.

FIG. 8 is an example flow diagram 150 for initiating an optimized reverse idle schedule, according to an example implementation. Initially, when the aircraft 102 transitions from air to ground (e.g., touchdown), the pilot commands the two or more engines 104*a-b* on the aircraft 102 to be operated in a reverse idle during a landing rollout of the aircraft 102. The controller 110*a-b* may operate the engines 104*a-b* in the reverse idle based on detection of touchdown and based on receiving outputs of the sensors 140*a-b* on the thrust lever 138*a-b* once the thrust lever 138*a-b* is operated by the pilot. A thrust lever resolver angle (TRA) is thus determined based on the outputs of the sensors 140*a-b* on the thrust lever 138*a-b*. As shown in FIG. 8, when both aircraft 102 touchdown and the TRA indicate reverse idle is commanded at block 152, then a reverse idle flag is set to true at block 154 to initiate the reverse idle. Following, with the engines 104*a-b* operating in reverse idle, during a first time period shown as three seconds at block 156, when no detection of failure is determined, the engines 104*a-b* are then operated at the reverse idle schedule 124*a-b* to provide reverse thrust for improved stopping performance, as shown at block 158. An amount of thrust is optimized for specific conditions of the landing.

The reverse idle schedule 124*a-b* is shown to take into account calibrated airspeed (VCAS) as well as an altitude (ALT) of the aircraft 102 at touchdown. For example, when the aircraft 102 is landing at higher speeds, a higher amount of reverse thrust can be used. In addition, an amount of reverse thrust can be based on an altitude of the airport to set such that for higher airports, a higher amount of reverse thrust can be used (e.g., at sea level, the reverse idle schedule 124*a-b* may be set to 20%, and at 5000 ft above sea level the reverse idle schedule 124*a-b* may be set at 40%).

Returning to block 156, outside of the first time period shown as three second at block 156, failures of the thrust reverser 106*a-b* are monitored based on outputs of the sensors 108*a-b*. When no detection of failure is determined at block 160, then the engines 104*a-b* continue to operate at the reverse idle schedule 124*a-b* to provide reverse thrust for improved stopping performance, as shown at block 158. However, when a detection of failure of deployment of a respective thrust reverser on one of the engines 104*a-b* is determined at block 160, then the failed engine is operated at a second reverse idle thrust (alternate reverse idle schedule 125*a-b*) optimized for a direction of an applied thrust of the failed engine, and the second reverse idle thrust is lower than a first reverse idle thrust indicated by the reverse idle schedule 124*a-b*. For example, the second reverse idle thrust (alternate reverse idle schedule 125*a-b*) may include operating the engines 104*a-b* at the same thrust level as the ground idle schedule 127*a-b*, as shown at block 162. An amount of thrust indicated for use by the ground idle schedule 127*a-b* may take into account the ALT of the aircraft 102 at touchdown and a delta ambient temperature from a standard day temperature (DTAMB), for example. Thus, an amount of thrust or speed of the engines 104*a-b* is commanded as well as a direction of the thrust as caused by deployment of the thrust reversers 106*a-b*.

Figure 9:
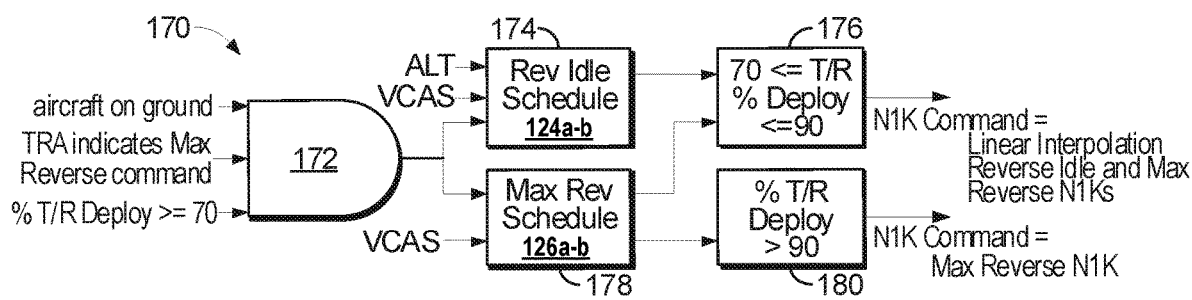
FIG. 9 is an example flow diagram for initiating an optimized maximum reverse idle schedule, according to an example implementation.

FIG. 9 is an example flow diagram 170 for initiating an optimized maximum reverse idle schedule, according to an example implementation. At block 172, once the aircraft 102 has made touchdown, and when the TRA indicates a maximum reverse command with a percentage deployment of the thrust reverser greater than or equal to 70%, then the engine 104*a-b* may accelerate above the reverse idle schedule 124*a-b*. The engine 104*a-b* will be limited to a thrust level (N1kCommand) based on a position of the thrust reverser 106*a-b* (% deployed). In order to accomplish thrust levels of the engine 104*a-b*, the reverse idle schedule 124*a-b* is calculated as a function of present altitude and speed (VCAS) as shown at block 174. The maximum reverse schedule 126*a-b* is also calculated as a function of present speed (VCAS), as shown at block 178. For example, when between 70% and 90% deployed, the engine thrust limit will be interpolated between the reverse idle schedule 124*a-b* and the maximum reverse schedule 126*a-b*, as shown at block 176. After the thrust reverser 106*a-b* has deployed greater than 90%, the engine thrust will be limited to the maximum reverse schedule 126*a-b*, as shown at block 180.

The thrust reverser 106*a-b* may be commanded to maximum reverse thrust by the pilot moving the thrust lever 138*a-b* to a max reverse thrust position. The controller 110*a-b* will then receive a command to initiate a maximum reverse thrust for slowing the aircraft 102 based on outputs from the sensor 140*a-b*, and responsively operate the engines 104*a-b* to cause a maximum reverse thrust for slowing the aircraft 102 from the landing rollout to a speed below a threshold, as shown in flow diagram 170.

Figure 10:
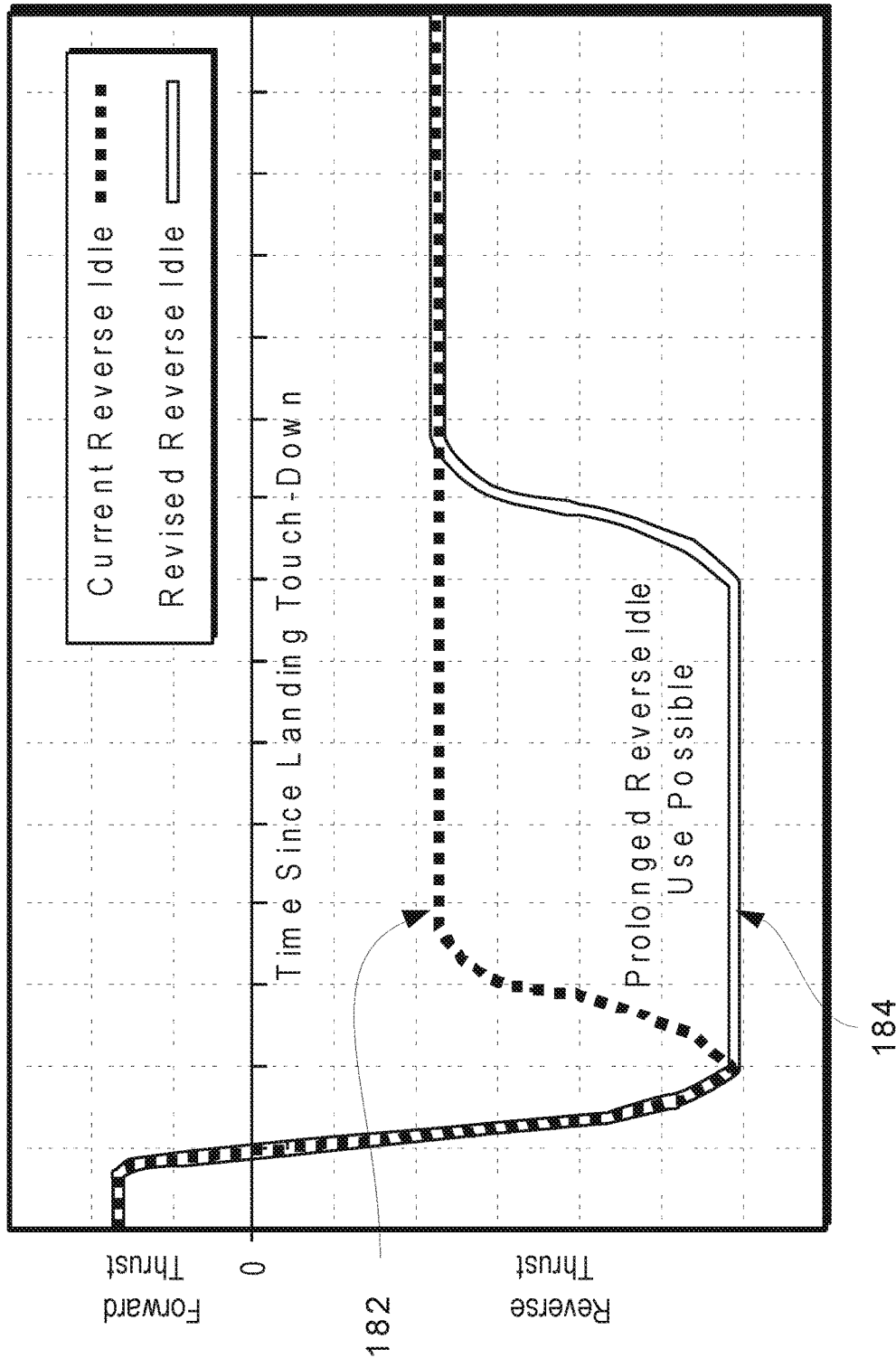
FIG. 10 is an example graph illustrating thrust applied by the engine using reverse idle after touchdown, according to an example implementation.

FIG. 10 is an example graph illustrating thrust applied by the engine 104*a-b* using reverse idle after touchdown, according to an example implementation. Initially, as shown at FIG. 10, upon touchdown, the engine 104a-b will be applying a forward thrust. However, once touchdown has been detected by touchdown sensors (e.g., on landing gear) and reverse thrust is commanded by the pilot, then the controllers 110a-b cause the thrust reversers 106a-b to move resulting in a reverse thrust applied by the engine 104a-b according to the reverse idle schedule 124a-b. Curve 182 illustrates an amount of reverse thrust applied by the engine 104a-b using existing reverse idle, in which reverse idle is only available for use momentarily upon touchdown (to enable max reverse if commanded by the pilot). Curve 184 illustrates new prolonged reverse idle use is possible for a longer duration of reverse thrust based on application of the failure detection methods described herein. As shown, reverse thrust is now available for a longer duration enabling improved stopping performance of the aircraft 102. In the example shown in FIG. 10, no failure is detected, and the reverse thrust is applied according to the reverse idle schedule 124a-b.

A magnitude of the reverse idle thrust directed by the reverse idle schedule 124a-b may be based on a number of factors including noise considerations of the engine 104a-b (reverse thrust adds to ambient noise and noise restrictions require use of lower thrust), a speed of the aircraft 102 (increased reverse thrust can be more beneficial with higher speeds), a targeted engine acceleration response to a higher level of reverse thrust, and/or desired airplane stopping performance, for example. If full power of reverse thrust is not desirable based on any of these or other factors, thrust reverse can be operated with a throttle set at less than full power, even down to idle power, which reduces stress and wear on engine components.

In FIG. 10, it is also shown that once a speed of the aircraft 102 decreases below a threshold (e.g., 60 knots), the reverse thrust of the engines 104a-b can be reduced to a lower level such that the reverse thrust for slowing the aircraft is maintained below aircraft controllability limits. Using reverse thrust, even if only for a portion of the aircraft landing rollout, will beneficially improve stopping performance as well as enable less costly design of other aircraft systems.

Figure 11:
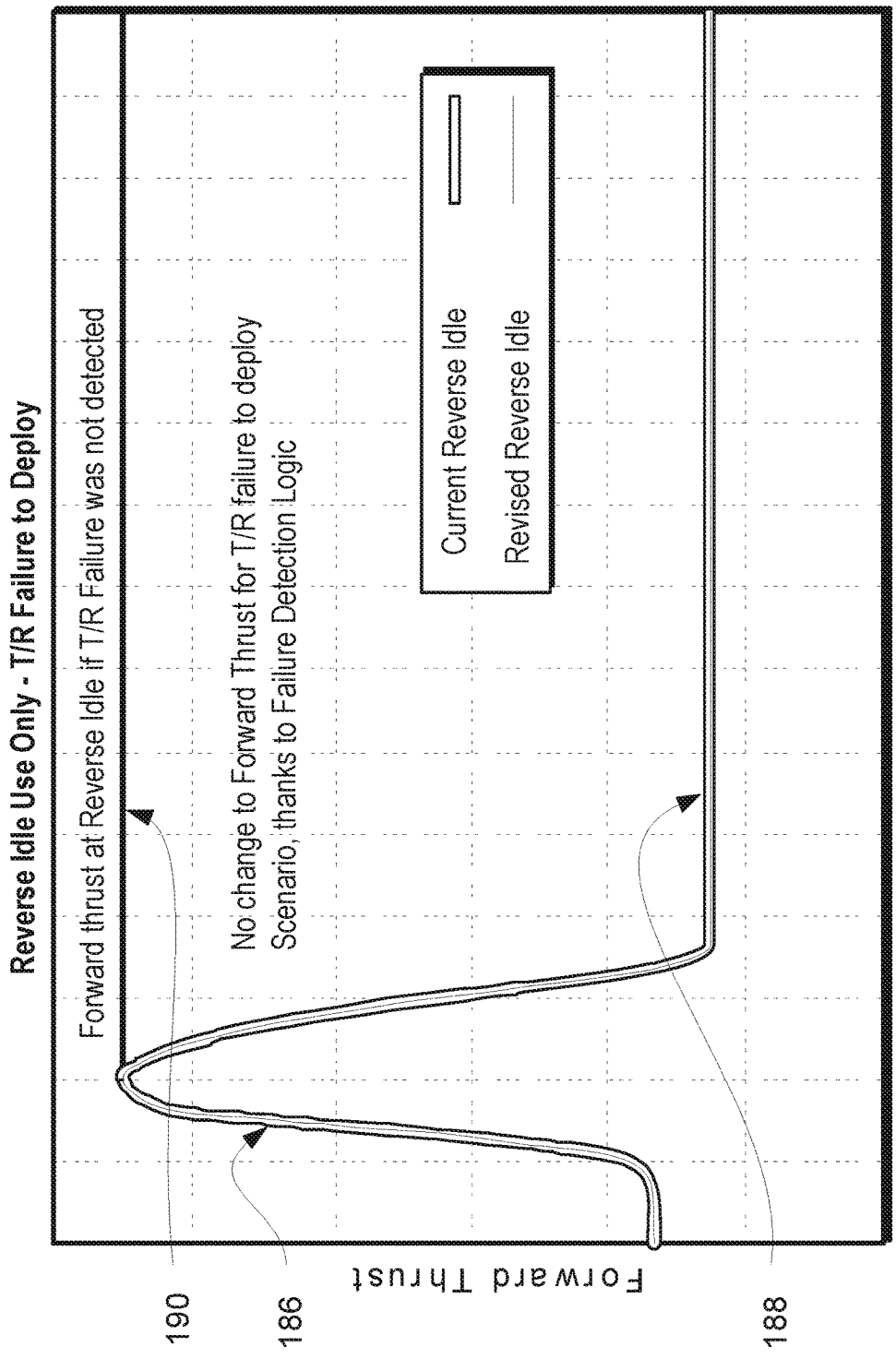
FIG. 11 is an example graph illustrating thrust applied by the engine after touchdown when a failure occurs, according to an example implementation.

FIG. 11 is an example graph illustrating thrust applied by the engine 104a-b after touchdown when a failure occurs, according to an example implementation. Initially, as shown at FIG. 11, upon touchdown, a small amount of forward thrust is applied by the engine 104a-b. After commanded by the pilot, the controller 110a-b then commands the thrust reverser 106a-b to apply reverse thrust according to the reverse idle schedule 124a-b. However, in this example, an error occurs and a failure of the thrust reverser 106a-b to deploy to the desired amount is detected. As a result, additional forward thrust will initially be applied by the engine, as shown by a portion 186 of the curve. This is undesirable as it can negatively impact stopping performance of the aircraft 102. As a result, upon detection of the failure, the controller 110a-b operates the failed engine at a lower thrust level causing a reduced forward thrust as shown by the portion of the curve 188.

FIG. 11 also illustrates an example in which if no failure was detected, the failed engine would remain at the thrust level indicated by the reverse idle schedule 124a-b providing a high amount of thrust but in a forward direction, as shown by curve 190. The failure detection mechanisms prevent this from occurring.

Figure 12:
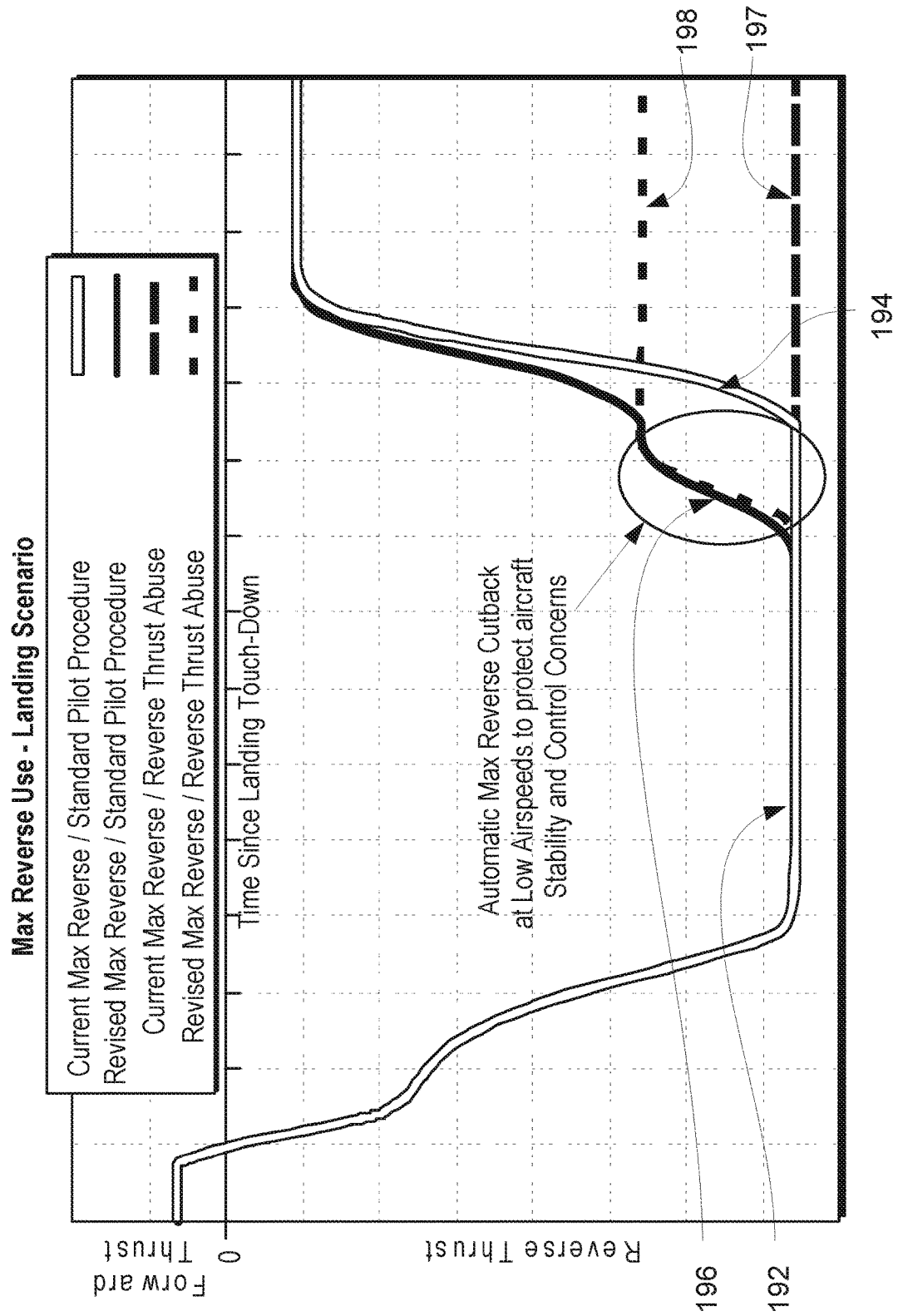
FIG. 12 is an example graph illustrating thrust applied by the engine after touchdown using maximum reverse thrust, according to an example implementation.

FIG. 12 is an example graph illustrating thrust applied by the engine 104a-b after touchdown using maximum reverse thrust, according to an example implementation. Initially, as shown at FIG. 12, upon touchdown, a small amount of forward thrust is applied by the engine 104a-b. The pilot then commands reverse thrust, and the controller 110a-b commands the thrust reverser 106a-b to deploy as well as operates the engines 104a-b to the reverse idle schedule 124a-b. After the thrust reverser 106a-b has deployed sufficiently, the pilot commands maximum reverse thrust 126a-b, and the engine 104a-b responds by commanding thrust per flow diagram 170. Reverse thrust applied by the engine 104a-b increases, as shown by curve 192, to a maximum reverse thrust. Existing maximum reverse thrust scheduling is shown by curve 194, in which reverse thrust is applied for a longer duration even at low airspeeds. However, using the optimized maximum reverse schedule 126a-b, a level of reverse thrust is reduced and cutback at low airspeeds (e.g., once the aircraft reaches 60 knots) to protect aircraft stability and control concerns, for example, as shown by curve 196.

FIG. 12 illustrates an example of maximum reverse schedule 126a-b as a function of airspeed. Although not used in many scenarios, pilots may choose to continue maximum reverse thrust use below the airspeed threshold recommended by the airplane manufacturer (typically around 60 kts). This option has remained available in existing reverse thrust scheduling solutions to allow pilots to continue to make use of maximum reverse thrust for airplane deceleration in emergency scenarios, for example. Curve 197 shows the max reverse thrust level available at low speeds for an existing reverse thrust solution. Curve 198 depicts automatic cut-back of the max reverse schedule as a function of airspeed to a lower level of max reverse thrust, designed to address airplane stability and control concerns for a failure scenario resulting in thrust asymmetry, while continuing to provide a level of thrust higher than reverse idle, allowing pilots access to reverse thrust abuse if deemed necessary.

Figure 13:
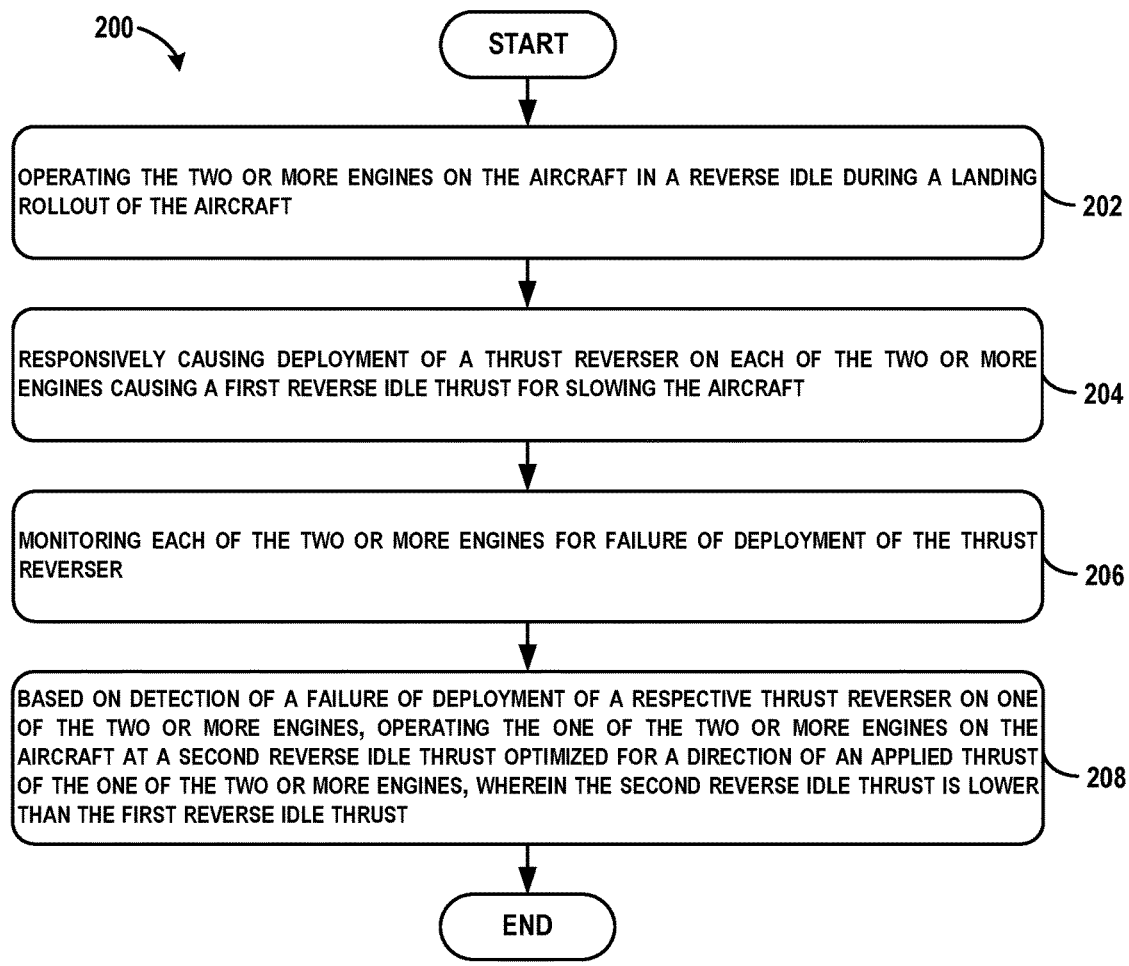
FIG. 13 shows a flowchart of an example method of optimizing reverse thrust operation on the aircraft having the two or more engines while landing the aircraft, according to an example implementation.

FIG. 13 shows a flowchart of an example method 200 of optimizing reverse thrust operation on the aircraft 102 having the two or more engines 104a-b while landing the aircraft 102, according to an example implementation. Method 200 shown in FIG. 13 presents an example of a method that could be used with the aircraft 102 shown in FIG. 1 or with components of the aircraft 102, for example. Further, devices or systems may be used or configured to perform logical functions presented in FIG. 13. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 13, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes operating the two or more engines 104a-b on the aircraft 102 in a reverse idle during a landing rollout of the aircraft 102.

At block 204, the method 200 includes responsively causing deployment of the thrust reverser 106a-b on each of the two or more engines 104a-b causing a first reverse idle thrust for slowing the aircraft 102. For example, the controller 110a-b may detect movement of the thrust lever 138a-b engaging a reverse idle position to initiate a thrust reverse command via outputs of the sensor 140a-b.

Figure 14:
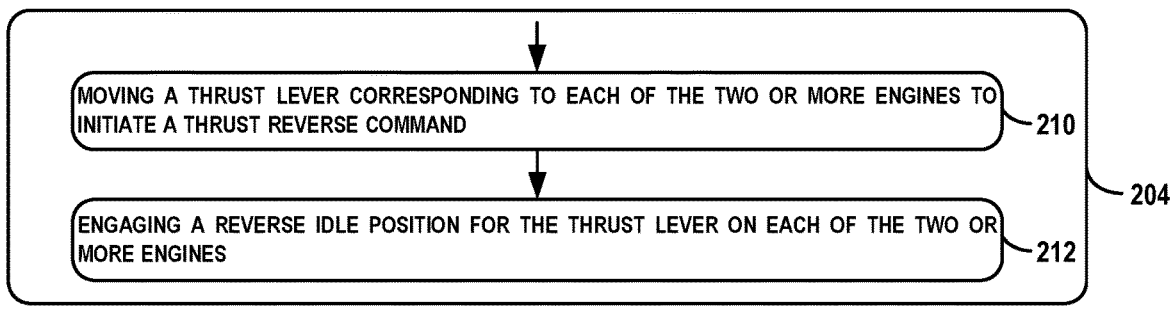
FIG. 14 shows a flowchart of an example method for causing deployment of the thrust reverser as shown in block, according to an example implementation.

FIG. 14 shows a flowchart of an example method for causing deployment of the thrust reverser 106a-b as shown in block 204, according to an example implementation. At block 210, functions include a pilot moving the thrust lever 138a-b corresponding to each of the two or more engines 104a-b to initiate a thrust reverse command, and at block 212 functions include engaging a reverse idle position for the thrust lever 138ab on each of the two or more engines 104a-b. In some examples, the position of the thrust reverser 106a-b at blocks 210 and 212 may be the same position.

The controller 110a-b may also monitor the altitude and the airspeed of the aircraft 102 to optimize scheduling of reverse thrust on the engine 104a-b. Upon touchdown and command from the pilot via the thrust lever 138a-b, the controller 110a-b may then command deployment of the thrust reverser 106a-b on each of the engine 104a-b for slowing the aircraft 102, and operate the aircraft 102 according to the reverse idle schedule 124a-b for a predetermined time period.

Within some examples, a magnitude of the first reverse idle thrust is based on noise considerations of the two or more engines 104a-b and a speed of the aircraft 102. The magnitude of the first reverse idle thrust may also be sized to improve stopping distance performance. As examples, different thrust levels may be used for each schedule, and examples include the ground idle schedule 127a-b may be 20% thrust, reverse idle schedule 124a-b may be 40% thrust, max reverse schedule 126a-b may be 100% thrust, and the alternate reverse idle schedule 125a-b may be the same as the ground idle schedule 127a-b or lower if possible for engine performance.

Returning to FIG. 13, at block 206, the method 200 includes monitoring each of the two or more engines for failure of deployment of the thrust reverser. In some examples, the controller 110a-b detects failure of each thrust reverser 106a-b independently, and can responsively take action to mitigate a detected failure for the failed engine only.

Figure 15:
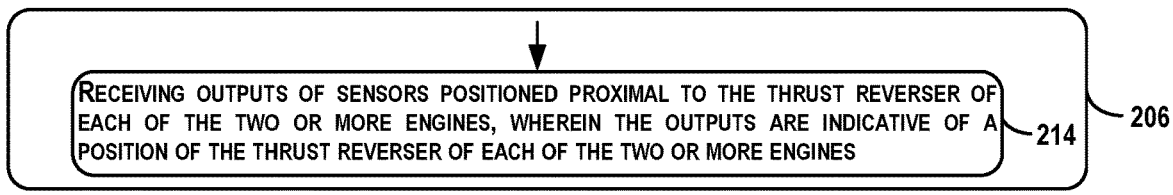
FIG. 15 shows a flowchart of an example method for performing monitoring as shown in block, according to an example implementation.

FIG. 15 shows a flowchart of an example method for performing monitoring as shown in block 206, according to an example implementation. At block 214, functions include the controller 110a-b receiving outputs of the sensor 108a-b positioned proximal to the thrust reverser 106a-b of each of the two or more engines 104a-b that are indicative of (or include data indicating) a position of the thrust reverser 106a-b of each of the two or more engines 104a-b. The controller 110a-b may then, based on the position of the thrust reverser 106a-b of each of the two or more engines 104a-b, determine whether a threshold amount of the thrust reverser 106a-b of each of the two or more engines 104a-b has been deployed.

Figure 16:
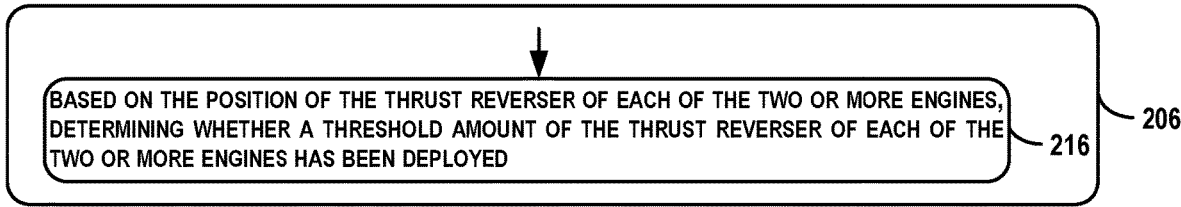
FIG. 16 shows a flowchart of an example method for performing monitoring as shown in block, according to an example implementation.

FIG. 16 shows a flowchart of an example method for performing monitoring as shown in block 206, according to an example implementation. At block 216, functions include based on the position of the thrust reverser 106a-b of each of the two or more engines 104a-b, determining whether a threshold amount of the thrust reverser 106a-b of each of the two or more engines 104a-b has been deployed. A threshold amount may be set to be about 60% or more, or in a range of about 60% to about 80%, for example.

Figure 17:
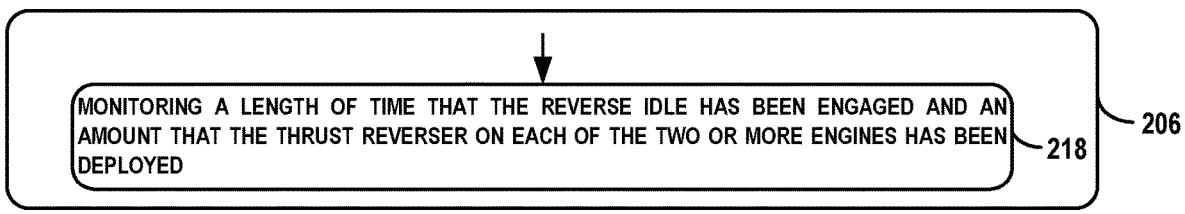
FIG. 17 shows another flowchart of an example method for performing monitoring as shown in block, according to an example implementation.

FIG. 17 shows another flowchart of an example method for performing monitoring as shown in block 206, according to an example implementation. At block 218, functions include the controller 110a-b monitoring a length of time that the reverse idle has been commanded and an amount that the thrust reverser 106a-b on each of the two or more engines 104a-b has been deployed for additional information as to whether a failure has occurred. For example, if reverse thrust has been commanded for a duration deemed sufficient for deployment of the thrust reverser 106a-b, and the thrust reverser 106a-b has failed to reach a threshold percentage of deployment, an error may be determined and accommodated.

Returning to FIG. 13, at block 208, the method 200 includes based on detection of a failure of deployment of a respective thrust reverser 106a-b on one of the two or more engines 104a-b, operating the one of the two or more engines 104a-b on the aircraft 102 at a second reverse idle thrust optimized for a direction of an applied thrust of the one of the two or more engines 104a-b. The second reverse idle thrust is lower than the first reverse idle thrust. Thus, when a failure is detected on any engine (e.g., failure to deploy the thrust reverser 106a-b), the controller 110a-b operates the failed engine on the aircraft 102 in a second reverse idle thrust level optimized for a direction of an applied thrust of the failed engine.

Figure 18:
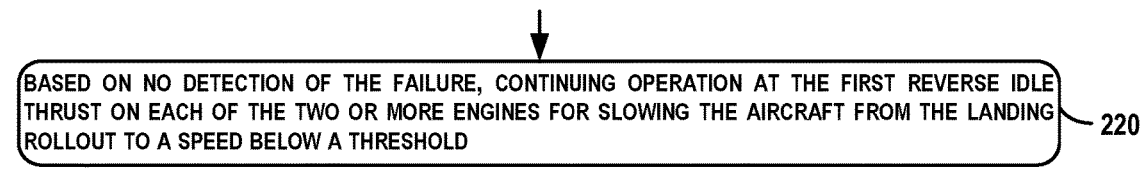
FIG. 18 shows a flowchart of an example method for use with the method, according to an example implementation.

FIG. 18 shows a flowchart of an example method for use with the method 200, according to an example implementation. At block 220, functions include based on no detection of the failure, continuing operation at the first reverse idle thrust on each of the two or more engines 104a-b for slowing the aircraft 102 from the landing rollout to a speed below a threshold.

Figure 19:
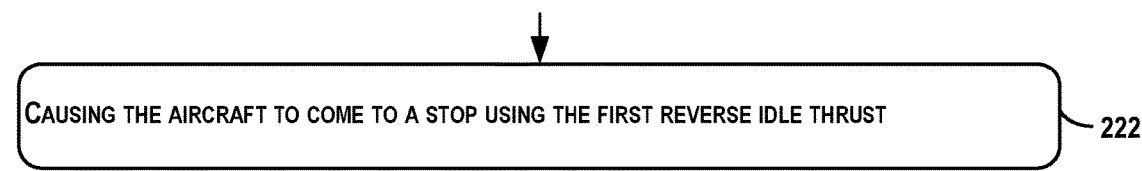
FIG. 19 shows a flowchart of an example method for use with the method, according to an example implementation.

FIG. 19 shows a flowchart of an example method for use with the method 200, according to an example implementation. At block 222, functions include causing the aircraft 102 to come to a stop using the first reverse idle thrust. In this example, braking may not be necessary to cause the aircraft 102 to come to a stop to save on maintenance of the brakes, for example.

Figure 20:
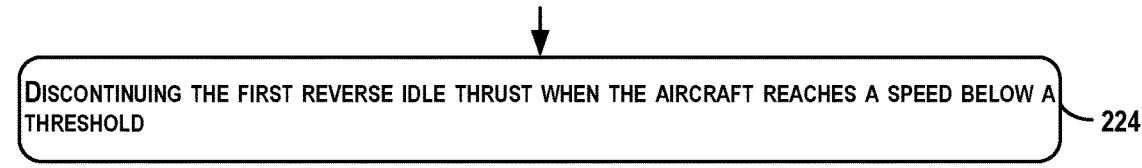
FIG. 20 shows a flowchart of an example method for use with the method, according to an example implementation.

FIG. 20 shows a flowchart of an example method for use with the method 200, according to an example implementation. At block 224, functions include discontinuing the first reverse idle thrust when the aircraft 102 reaches a speed below a threshold. Below this threshold, the controller 110a-b commands a lower level of reverse idle thrust, e.g. ground idle schedule 127a-b, to prevent undesirable effects such as exhaust re-ingestion.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of optimizing reverse thrust operation on an aircraft having two or more engines while landing the aircraft, the method comprising:
    operating the two or more engines on the aircraft in a reverse idle during a landing rollout of the aircraft;
    responsively causing deployment of a thrust reverser on each of the two or more engines causing a first reverse idle thrust for slowing the aircraft;
    monitoring each of the two or more engines for failure of deployment of the thrust reverser; and
    based on detection of a failure of deployment of a respective thrust reverser on one of the two or more engines, operating the one of the two or more engines on the aircraft at a second reverse idle thrust optimized for a direction of an applied thrust of the one of the two or more engines, wherein the second reverse idle thrust is lower than the first reverse idle thrust.

2. The method of claim 1, wherein operating the two or more engines on the aircraft in the reverse idle during the landing rollout of the aircraft comprises:
    moving a thrust lever corresponding to each of the two or more engines to initiate a thrust reverse command; and
    engaging a reverse idle position for the thrust lever on each of the two or more engines.

3. The method of claim 1, wherein a magnitude of the first reverse idle thrust is based on noise considerations of the two or more engines and a speed of the aircraft.

4. The method of claim 1, wherein monitoring each of the two or more engines for failure of deployment of the thrust reverser comprises:
    receiving outputs of sensors positioned proximal to the thrust reverser of each of the two or more engines, wherein the outputs are indicative of a position of the thrust reverser of each of the two or more engines.

5. The method of claim 4, further comprising:
    based on the position of the thrust reverser of each of the two or more engines, determining whether a threshold amount of the thrust reverser of each of the two or more engines has been deployed.

6. The method of claim 1, wherein monitoring each of the two or more engines for failure of deployment of the thrust reverser comprises:
    monitoring a length of time that the reverse idle has been commanded and an amount that the thrust reverser on each of the two or more engines has been deployed.

7. The method of claim 1, further comprising:
    based on no detection of the failure, continuing operation at the first reverse idle thrust on each of the two or more engines for slowing the aircraft from the landing rollout to a speed below a threshold.

8. The method of claim 1, further comprising:
    causing the aircraft to come to a stop using the first reverse idle thrust.

9. The method of claim 1, further comprising:
    discontinuing the first reverse idle thrust when the aircraft reaches a speed below a threshold.

10. A non-transitory computer readable storage medium having stored therein instructions, that when executed by a computing device having one or more processors, causes the computing device to perform functions comprising:
    operating two or more engines on an aircraft in a reverse idle during a landing rollout of the aircraft;
    responsively causing deployment of a thrust reverser on each of the two or more engines causing a first reverse idle thrust for slowing the aircraft;
    monitoring each of the two or more engines for failure of deployment of the thrust reverser; and
    based on detection of a failure of deployment of a respective thrust reverser on one of the two or more engines, operating the one of the two or more engines on the aircraft at a second reverse idle thrust optimized for a direction of an applied thrust of the one of the two or more engines, wherein the second reverse idle thrust is lower than the first reverse idle thrust.

11. The non-transitory computer readable storage medium of claim 10, wherein the functions further comprise:
    based on a speed of the aircraft decreasing below a threshold, causing reverse thrust of the two or more engines to be reduced such that the reverse thrust for slowing the aircraft is maintained below aircraft controllability limits.

12. The non-transitory computer readable storage medium of claim 10, wherein a magnitude of the first reverse idle thrust is based on noise considerations of the two or more engines and a speed of the aircraft.

13. The non-transitory computer readable storage medium of claim 10, wherein monitoring each of the two or more engines for failure of deployment of the thrust reverser comprises:

receiving outputs of sensors positioned proximal to the thrust reverser of each of the two or more engines, wherein the outputs are indicative of a position of the thrust reverser of each of the two or more engines.

14. The non-transitory computer readable storage medium of claim 13, wherein the functions further comprise:
based on the position of the thrust reverser of each of the two or more engines, determining whether a threshold amount of the thrust reverser of each of the two or more engines has been deployed.

15. The non-transitory computer readable storage medium of claim 10, wherein monitoring each of the two or more engines for failure of deployment of the thrust reverser comprises:
monitoring a length of time that the reverse idle has been commanded and an amount that the thrust reverser on each of the two or more engines has been deployed.

16. The non-transitory computer readable storage medium of claim 10, wherein the functions further comprise:
based on no detection of the failure, continuing operation at the first reverse idle thrust on each of the two or more engines for slowing the aircraft from the landing rollout to a speed below a threshold; and
based on detection of the failure, operating at the second reverse idle thrust on each of the two or more engines for maintaining controllability of the aircraft during the landing.

17. The non-transitory computer readable storage medium of claim 10, wherein the functions further comprise:
discontinuing the first reverse idle thrust when the aircraft reaches a speed below a threshold.

18. An aircraft, comprising:
two or more engines each having a thrust reverser for causing a first reverse idle thrust for slowing the aircraft and a second reverse idle thrust for minimizing thrust in a failure case, wherein the second reverse idle thrust is lower than the first reverse idle thrust such that a magnitude of thrust is reduced in the failure case;
sensors for each of the thrust reverser on each of the two or more engines, wherein a respective sensor is positioned proximal to the thrust reverser of a respective engine and the respective sensor provides outputs indicative of a position of the thrust reverser for the respective engine; and
a controller for each of the two or more engines, having one or more processors for receiving the outputs of the respective sensor and determining based on the position of the thrust reverser for the respective engine whether a threshold amount of the thrust reverser has been deployed to cause the first reverse idle thrust during a landing rollout of the aircraft, and the controller further, based on detection of a failure of deployment of a respective thrust reverser on one of the two or more engines at least the threshold amount, operating the one of the two or more engines at a second reverse idle thrust optimized for a direction of an applied thrust of the one of the two or more engines.

19. The aircraft of claim 18, wherein the controller is further configured to, based on no detection of the failure, cause operation of the two or more engines in the first reverse idle thrust for slowing the aircraft from the landing rollout to a speed below a threshold.

20. The aircraft of claim 18, wherein the controller is further configured to:
receive a command to initiate a maximum reverse thrust for slowing the aircraft, wherein the maximum reverse thrust is greater than the first reverse idle thrust; and
cause reverse thrust on each of the two or more engines to a maximum reverse thrust for slowing the aircraft from the landing rollout to a speed below a threshold.

* * * * *